United States Patent [19]
Gross et al.

[11] Patent Number: 5,899,426
[45] Date of Patent: May 4, 1999

[54] BUILT-IN, MOVABLE, OBJECT SUPPORT DEVICE

[75] Inventors: Andreas Gross, Solingen; Alfred Mai, Hückeswagen; Hans-Helmut Mieglitz, Monheim, all of Germany

[73] Assignee: Becker Group Europe GmbH, Germany

[21] Appl. No.: 08/718,139

[22] Filed: Sep. 18, 1996

[30] Foreign Application Priority Data

Sep. 20, 1995 [DE] Germany .................. 195 34 840

[51] Int. Cl.⁶ ......................................... A47K 1/00
[52] U.S. Cl. ............................. 248/311.2; 248/285.1; 297/188.01; 224/926
[58] Field of Search .................... 248/311.2, 309.1, 248/310, 312, 312.1, 315, 285.1; 297/188.01, 188.14, 188.15, 188.17, 188.11, 188.19; 224/926, 281, 282

[56] References Cited

U.S. PATENT DOCUMENTS

| | | | |
|---|---|---|---|
| 2,107,845 | 2/1938 | Albert | 206/14.5 |
| 3,606,112 | 9/1971 | Cheshier | 224/926 |
| 4,948,169 | 8/1990 | Amundson | 224/282 |
| 5,190,259 | 3/1993 | Okazaki | 248/311.2 |
| 5,228,611 | 7/1993 | Yabuya | 224/281 |
| 5,248,183 | 9/1993 | Gignac et al. | 248/311.2 |
| 5,259,580 | 11/1993 | Anderson et al. | 248/311.2 |
| 5,297,709 | 3/1994 | Dykstra et al. | 224/28.1 |
| 5,318,343 | 6/1994 | Spykerman et al. | 297/188.16 |
| 5,527,008 | 6/1996 | Schutter et al. | 248/311.2 |
| 5,628,486 | 5/1997 | Rossman et al. | 248/311.2 |

FOREIGN PATENT DOCUMENTS

| | | |
|---|---|---|
| 22 05 808 | 5/1974 | France . |
| 0 074 026 B1 | 3/1983 | Germany . |
| 31 35 314 A1 | 3/1983 | Germany . |
| 31 33 299 A1 | 4/1983 | Germany . |
| 33 16 756 A1 | 11/1983 | Germany . |
| 39 39 498 A1 | 6/1991 | Germany . |
| 92 07 583 U | 11/1993 | Germany . |
| 44 23 097 A1 | 1/1995 | Germany . |
| 2 209 656 | 5/1989 | United Kingdom . |

OTHER PUBLICATIONS

German Search Report dated Feb. 22, 1996.

*Primary Examiner*—Leslie A. Braun
*Assistant Examiner*—Kimberly Wood
*Attorney, Agent, or Firm*—Harness, Dickey & Pierce, P.L.C.

[57] ABSTRACT

A built-in, movable, object support for installation in a console, or the like, including a housing having two opposite first side walls and an opening defined by and between the first side walls. An insert is installed through the opening in the housing. The insert has second opposite sides opposed to respective ones of the first side walls. The insert has a front closure wall which serves as a support for an object when the insert is out of the housing. Object holding and support elements are at and above the closure wall. Converging guide ribs on the housing first side walls and slide pieces on the insert second sides engage the ribs. The orientation of the ribs are such that the insert turns with reference to the housing as it moves in and out of the housing due to the guidance of the ribs. The closure wall of the insert is substantially horizontal for supporting an object with the insert out of the housing. Additional object holding elements are supported at the closure wall of the insert.

15 Claims, 2 Drawing Sheets

BUILT-IN, MOVABLE, OBJECT SUPPORT DEVICE

BACKGROUND OF THE INVENTION

The present invention relates to a built-in, movable, object support device, particularly for vehicles, having a housing with two opposite side walls, an opening between the two side walls, an insert which can be pushed into and moved out of the housing through the opening, and a front closure wall on the insert.

Such built-in supports are used in vehicles, for instance, as ash trays (see, for instance, Federal Republic of Germany DE 31 33 299 A1 or DE 31 35 314 A1). Although known supports have proven satisfactory in practice, there are frequent difficult installation conditions, particularly if the insert is not fixed in position, for instance, a radio, but the insert is instead arranged or guided for sliding in the housing, for instance, ash trays. In such a case, pulling the insert out from the housing in a straight line is frequently made difficult by neighboring parts, such as switch knobs, or the like. The remedy of using a multiple kinematic arrangement generally is not considered due to the added expense.

SUMMARY OF THE INVENTION

The object of the present invention is to provide a built-in, movable, object support of the aforementioned type which can be used even for difficult installation which do not permit pulling the insert out of the housing along a straight line or in installations where the orientation of the support is to change between its use and stored non-use position. In addition, the insert device is to be simple, inexpensive and operate reliably.

A built-in, movable, object support for installation in a console, or the like, for use, for instance, in a vehicle includes a housing having two opposite first side walls and an opening defined by and between the first side walls. An insert can be pushed into the housing through the opening. The insert has second opposite sides which are opposed to the respective first side walls when the insert is in the housing. The insert has a front closure wall which serves as a support for an object when the insert is out of the housing. There are object holding and support elements at and above the closure wall.

Guide means on the side walls of the housing and of the insert move the insert from a position of non-use within the housing along a circular path of translation into a position of use in which a region of the insert extends out of the housing. In that position, the closure wall is substantially horizontal. The guide means comprise converging guide ribs formed on the interior of the housing first side walls and slide pieces positioned on the insert second sides and engaging the ribs, or vice versa with the ribs on the second sides. The orientation of the ribs is such that the insert turns or swivels with reference to the housing as it moves in and out of the housing due to the guidance of the ribs, and the insert moves so that the closure wall of the insert is substantially horizontal for supporting an object with the insert out of the housing.

Upon the insert being pulled out of the housing, the insert moves over a path which is both linear outward and curves arcuately. The closure wall extends obliquely in the housing. When it is moved into its position of use, the insert is brought into a substantially horizontal position where it can be used as a tray for supporting different objects. The path of movement for the insert enables its front or leading end, which is adjacent to the housing opening, to easily pass by an obstacle that may be present in front of the built-in, movable, object support, for instance, an obstacle like a switch button. This would not be possible in the case of purely linear extraction.

In a preferred embodiment of the invention, each of the side walls of the housing has guide ribs extending from the opening, in the pushing direction and converging toward the rear. Slide pieces which are pivoted on the insert are associated with the ribs. In the alternative, ribs could be on the insert and slide pieces on the housing wall. One of the guide ribs present on each side wall can extend parallel to the side edges of the respective side wall. This would be the upper guide rib if the insert is to be moved in the upward direction. The upper guide rib effects the linear path of extraction, while the lower guide rib, which extends obliquely to the upper rib, causes a simultaneous swivel motion of the insert. The path for the insert is established by the slide pieces pivoted thereon. To enable pivoting of the slide pieces, pivot pins directed perpendicular to the path of movements are provided.

In a development of the invention, the insert may have an extension wall which protrudes beyond the closure wall. That has a cover pivoted to it. The cover closes the opening of the housing when the insert is in the position of non-use within the housing.

In a further development of the invention, the cover can have holding elements on its inner side facing the insert, which elements extend approximately perpendicularly to the cover. This secures objects placed on the closure wall of the insert against dropping down.

Furthermore, at least one spring can be arranged on the insert for urging the cover to swing in the open direction. Since the cover is always urged into the open position, the holding elements that are arranged on the cover are correctly positioned when the insert is in its use position. Closure latches on the holding elements grip around the upper guide ribs in the position of non-use of the insert, and this prevents the cover from moving open.

The insert is actuated by a grip mold formed in the cover being grasped and moved.

In a further development of the invention, the open position of use of the insert can advantageously be defined such that the insert has on its top a spring tongue that is cut free on three sides and that has on its bottom at least one downwardly extending projection, in each case for engagement in recesses in the housing. Depressing the spring tongue can eliminate the engagement and the insert can be pulled entirely out of the housing.

The closure wall can be provided with standing surfaces for objects. It is advisable to roughen them or possibly provide them with a slip-proof covering. The built-in, movable, object support of the invention is preferably developed as a beverage can or glass holder.

Other objects, features and advantages of the present invention will become apparent from the following description of an embodiment of the invention which refers to the accompanying drawings.

DETAILED DESCRIPTION OF A PREFERRED EMBODIMENT OF THE INVENTION

Figure 1:
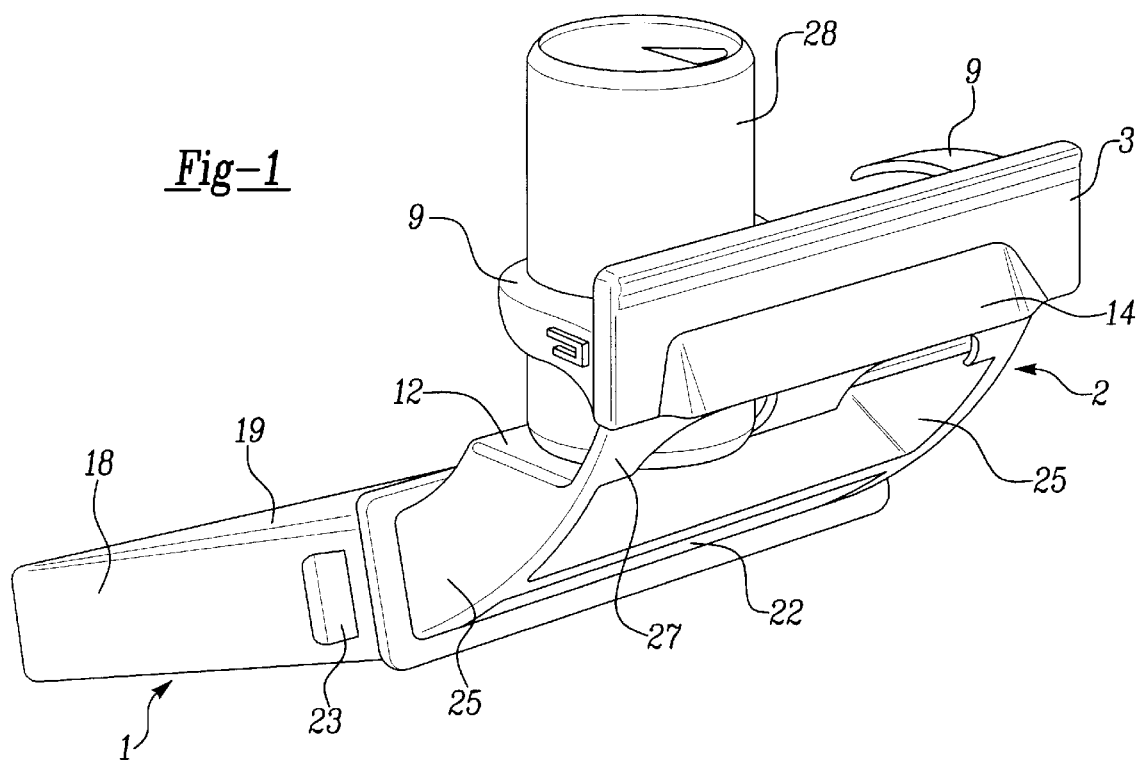
FIG. 1 an overall perspective view of the built-in, movable object support.

The built-in, movable, object support of the invention is shown in the form of a beverage can holder or a cup holder. The built-in, movable, object support can, however, also advantageously be used for other purposes.

The built-in, movable, object support comprises a housing 1 and an insert 2 that is received in the housing 1. The housing 1 is of substantially rectangular development and has first side walls 18, a head wall 19, a bottom wall 20, and a rear end wall 21. On its front, the housing 1 has an opening 22. Installation of the housing 1 into an instrument panel of a vehicle, or the like, is effected in a customary manner. Lateral detent hooks 23 and possible screw connections, not shown, are provided for holding it.

At least one first side wall and preferably each first side wall 18 of the housing 1 supports two guide ribs 7 which extend from the opening 22 and converge toward the rear. Each upper guide rib 7 extends parallel to the head wall 19. The guide ribs 7 may have a length which corresponds to the length of the side walls 18.

Figure 2:
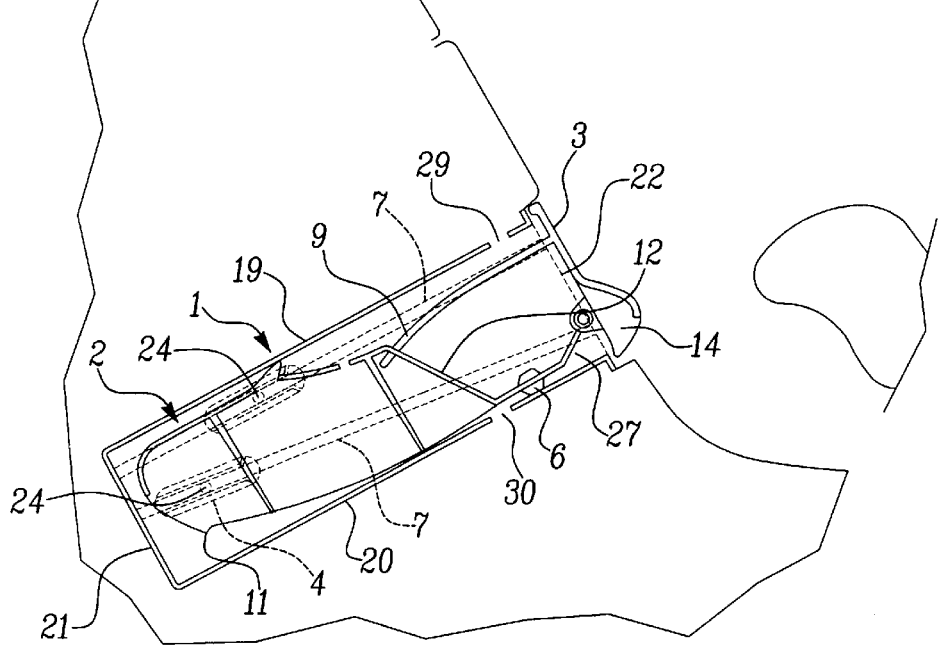
FIG. 2 is a longitudinal section through the built-in, movable, object support, showing the support in its position of non-use.
Figure 3:
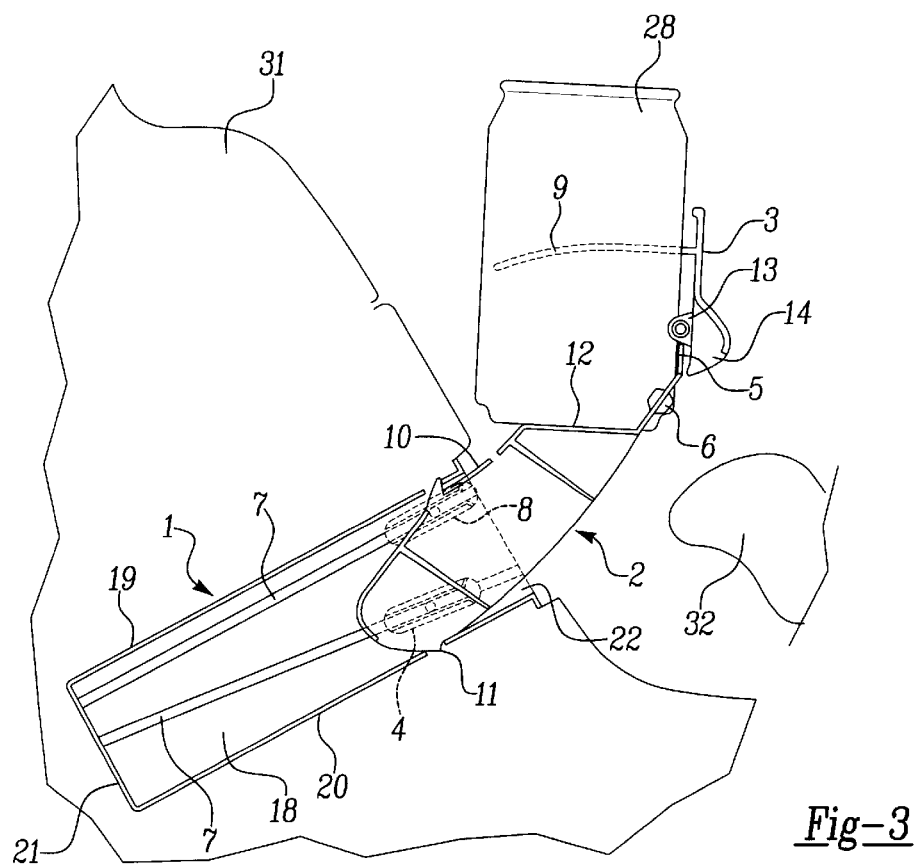
FIG. 3 is a longitudinal section through the built-in, movable, object support, showing the support in its position of use.
Figure 4:
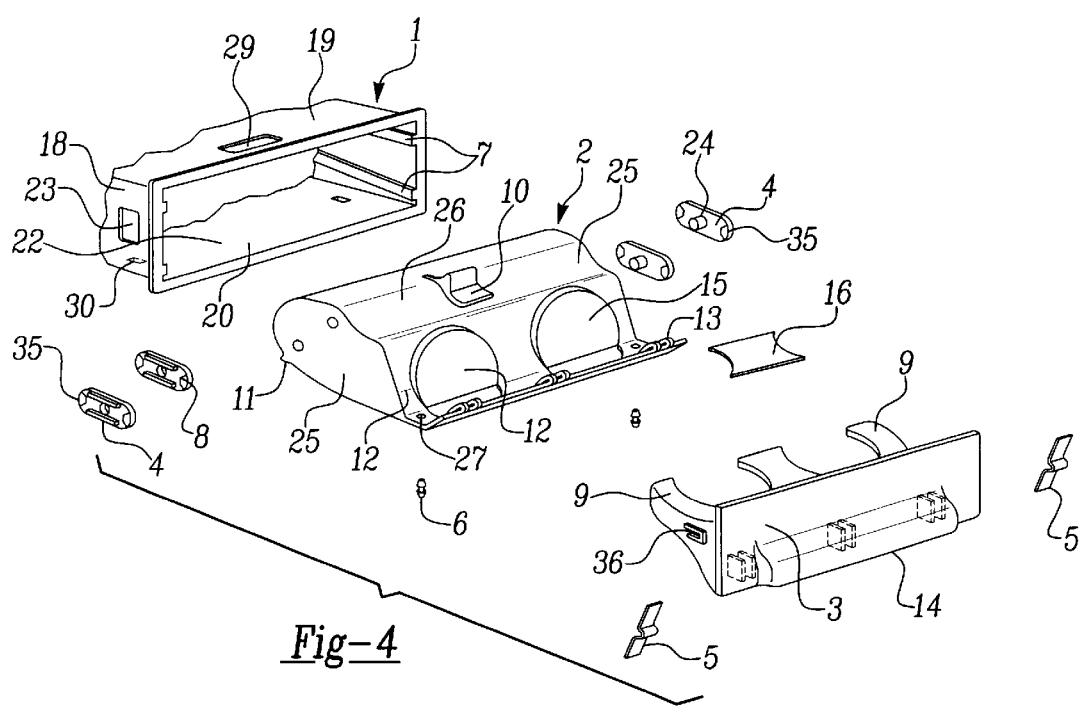
FIG. 4 is an exploded perspective view of the built-in, movable, object support.

The housing 1 fully receives the insert 2 when it is in a position of non-use shown in FIG. 2 and partly receives the insert in a position of use shown in FIGS. 1 and 3. The insert 2 is so arranged and guided in the housing 1 that it can be moved from the position of non-use, over a circular path of translation, into the position of use in which it extends partly out of the housing 1. The path of movement of the insert 2 is defined by interaction of the guide ribs 7 on the housing 1 with slide pieces 4 that are pivoted to the insert 2 by pivot pins 24.

The insert 2 has two side walls 25, a head wall 26 connecting them, a front closure wall 12, and an extension wall 27 which extends beyond the closure wall and on which a cover 3 is pivoted. Each of the side walls 25 has two holes for the pivot pins 24 that are staggered with respect to each other in the vertical and longitudinal directions of the side walls 25. The pivot pins 24 support the slide pieces 4, which can thus turn on an insert 2. The slide pieces 4 are guided by guides 8 on the guide ribs 7. Spring elements 35 act to equalize play and tolerance on the slide pieces 4.

The cover 3 is pivoted on the insert 2 or on its extension wall 27 by a hinge bearing 13. The cover 3 is urged by torsion springs 5 in the open direction. The torsion springs 5, which are arranged at the hinge place 13, rest with one arm against the cover and with the other arm against the extension wall 27. Holding elements 9 for holding beverage cans 28, cups or the like, are directed approximately perpendicular to the cover 3 and are rigidly connected to the cover.

When the insert 2 is in the position of non-use shown in FIG. 2, its closure wall 12 lies in an oblique direction in the housing 1. By pulling the insert 2 out of the housing 1, the closure wall 12 is brought into the horizontal orientation, as can be noted from FIGS. 1 and 3. For facilitating that pulling of the insert, the cover 3 has a grip trough 14. Upon pulling out of the insert 2, the upper pivot pins 24 move over a linear path of movement, and the lower pivot pins 24 also follow a linear path of movement. But the lower path is at an angle diverging from the upper path of movement. The insert 2 is thus swung or swiveled around the upper pivot pin 24 at the same time as it is pulled linearly out of the housing 1, so that the rear edge of the insert 2 is being moved continuously downward and the front edge of the insert is being moved continuously upward. The extraction movement is completed when the closure wall 12 is in the horizontal orientation. In this position, a three point detent means attachment is provided for the insert 2, in the form of a spring tongue 10 which is cut free on three sides in the head wall 26 and two projections 11 extending from the bottom of the insert 2, which engage in corresponding housing recesses 29, 30.

Closure latches 36 on the holding elements 9 rest against the guide ribs 7 when the insert 2 is in the position of non-use. As soon as the holding elements 9 slide out of the opening 22, they are brought into their position of use by the torsion springs 5, together with the cover 3.

To return the insert 2 into the housing 1, slight pressure is applied to the free upper edge of the cover 3. As a result, the holding elements can also be moved downward and introduced easily into the housing 1. In the end inserted position shown in FIG. 2, there is again a three point attachment for the insert 2. It is formed by the upper spring tongue 10 which rests against the head wall 19 of the housing 1 and by lower stop bumpers 6 which rest on the bottom wall 20 of the housing 1.

The closure wall 12 is formed with elevated standing surfaces 15 which are fluted or otherwise roughened or else can be provided with a slip-proof covering. The width of opening provided between the holding elements 9 can be varied by sponge-rubber equalization tongues 16.

The housing 1, the insert 2, the cover 3, as well as the slide pieces 4 are preferably developed as inexpensive plastic injection moldings.

In FIGS. 2 and 3, the new built-in, movable, object support is arranged in an inner part 31 of the vehicle, which may be an instrument panel, a console, or the like. FIGS. 2 and 3 show a switch knob 32 in front of the built-in, movable, object support past which the insert 2 can slide without problem, because of its path of movement in accordance with the invention.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A built-in, movable, object support, adaptable for being moved between a non-use position and use position, the support comprising:

a housing having two longitudinally extending, opposite first side walls and an opening into the housing between the first side walls;

an insert insertable through the opening into the housing and movable out of the housing opening, the insert comprising:

a front closure wall adapted and oriented so that with the insert in the use position out of the housing, the front closure wall can support objects thereon; the insert including opposite second sides, each respectively opposed to one of the first side walls of the housing when the insert is inserted in the housing;

guide means on the first side walls of the housing and the respective second sides of the insert such that as the insert moves between a position of non-use in the housing and a position of use with the front closure wall and the second sides extending at least in part out of the housing, the guide means for guiding the insert to move both linearly into or outward of the housing and also in a generally circular path between the non-use position, where the closure wall is not oriented to support an object, and the use position, with the insert out of the housing and at which the closure wall is oriented to be generally able to support an object thereon; wherein the guide means on one of either the first walls of the housing and the second sides of the insert comprise guide ribs extending generally in the longitudinal direction of the housing and generally in the direction of movement of the insert into and out of the housing, wherein the guide ribs are oriented so as to converge toward each other toward the rear inward end of the housing, and the guide means on the other of the first side walls and the second sides engage the guide ribs so that the convergence of the guide ribs causes the insert to move over a circular path as the insert moves between the position of non-use in the housing and the position of use generally out of the housing.

2. The support of claim 1, further comprising an extension wall extending beyond and covering over the closure wall; and a cover pivoted to the extension wall, wherein with the insert in the housing, the cover is in the housing and with the insert out of the housing, the cover may be moved to a position allowing access to the closure wall.

3. The support of claim 2, further comprising holding elements on the cover for holding an object on the closure wall, the holding elements and the cover on which they are mounted being so oriented that with the cover open away from the closure wall, the holding elements are in a position to hold an object on the closure wall, and with the insert in the housing and the cover closed down over the housing, the holding elements are inside the housing.

4. The support of claim 3, wherein the holding elements extend approximately perpendicular to the cover so that with the cover over the housing, the holding elements extend into the housing.

5. The support of claim 3, further comprising a spring on the insert and acting on the cover for normally urging the cover in the opening direction, so that with the insert out of the housing, the cover moves to move the holding elements to a position to support an object on the closure wall.

6. The support of claim 3, further comprising a grip on the cover for being gripped to enable moving the cover to move the insert with reference to the housing.

7. The support of claim 3, wherein the insert has detent means thereon positioned for engaging in the housing for holding the insert in the housing when the insert is installed therein.

8. The support of claim 7, wherein the detent means on the insert comprise a spring tongue on the insert and projections on the insert, and respective recesses in the housing for the tongue and the projections, the recesses being positioned for receiving the tongue and projections when the insert is inserted into the housing.

9. The support of claim 3, further comprising object standing support regions defined on the closure wall.

10. The support of claim 3, wherein the holding elements are shaped for supporting a beverage container on the closure wall.

11. The support of claim 1, further comprising object standing support regions defined on the closure wall.

12. The support of claim 1 wherein the guide means comprise a linear guide in one of the insert or the housing and a pivotable guide in the other of the insert or the housing.

13. A built-in, movable, object support, adaptable for being moved between a non-use position and use position, the support comprising:

a housing having two longitudinally extending, opposite first side walls and an opening into the housing between the first side walls;

an insert insertable through the opening into the housing and movable out of the housing opening, the insert comprising:

a front closure wall adapted and oriented so that with the insert in the use position out of the housing, the front closure wall can support objects thereon; the insert including opposite second sides, each respectively opposed to one of the first side walls of the housing when the insert is inserted in the housing;

guide means on the first side walls of the housing and the respective second sides of the insert such that as the insert moves between a position of non-use in the housing and a position of use with the front closure wall and the second sides extending at least in part out of the housing, the guide means for guiding the insert to move both linearly into or outward of the housing and also in a generally circular path between the non-use position, where the closure wall is not oriented to support an object, and the use position, with the insert out of the housing and at which the closure wall is oriented to be generally able to support an object thereon;

wherein the guide means on the first side walls of the housing comprise guide ribs extending generally in the longitudinal direction of the housing along the respective first side wall and generally in the direction of movement of the insert into and out of the housing, wherein the guide ribs are oriented so as to converge toward each other toward the rear inward end of the housing, and the guide means on the second sides engage the guide ribs so that the convergence of the guide ribs causes the insert to move over a circular path as the insert moves between the position of non-use in the housing and the position of use generally out of the housing.

14. The support of claim 13, wherein the guide means further comprises slide elements at the second sides of the insert respectively for engaging two of the guide ribs on the housing first side wall for defining the guide means.

15. The support of claim 14, wherein the slide element on the insert comprise slide pieces engaging the guide ribs and being pivotably mounted on the insert for pivoting with respect to the insert as the insert is moved into and out of the housing, so that movement of the insert moves the slide pieces along the guide ribs and the orientation of the slide pieces on the guide ribs as the insert moves with reference to the housing causes the slide pieces to pivot on the insert.

* * * * *

UNITED STATES PATENT AND TRADEMARK OFFICE
CERTIFICATE OF CORRECTION

PATENT NO. : 5,899,426
DATED : May 4, 1999
INVENTOR(S) : Andreas Gross, Alfred Mai, Hans-Helmut Mieglitz It is certified that error appears in the above-indentified patent and that said Letters Patent is hereby corrected as shown below:

Column 6, line 51, Claim 15, after "slide", please delete "element" and insert --elements-- therefor.

Signed and Sealed this

Twenty-eighth Day of September, 1999

Attest:

Q. TODD DICKINSON

*Attesting Officer*           *Acting Commissioner of Patents and Trademarks*